(12) United States Patent  
Cui et al.

(10) Patent No.: US 12,512,952 B2  
(45) Date of Patent: Dec. 30, 2025

(54) REFERENCE SIGNALS IN ACTIVE TCI SWITCHING

(71) Applicant: Apple Inc., Cupertino, CA (US)

(72) Inventors: Jie Cui, San Jose, CA (US); Chunxuan Ye, San Diego, CA (US); Dawei Zhang, Saratoga, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/778,078

(22) PCT Filed: Aug. 6, 2021

(86) PCT No.: PCT/CN2021/111177  
§ 371 (c)(1),  
(2) Date: May 19, 2022

(87) PCT Pub. No.: WO2023/010526  
PCT Pub. Date: Feb. 9, 2023

(65) Prior Publication Data  
US 2024/0204970 A1    Jun. 20, 2024

(51) Int. Cl.  
*H04L 5/00* (2006.01)  
*H04B 17/318* (2015.01)  
*H04W 72/23* (2023.01)

(52) U.S. Cl.  
CPC ......... *H04L 5/0094* (2013.01); *H04B 17/328* (2023.05); *H04W 72/23* (2023.01)

(58) Field of Classification Search  
CPC ..... H04L 5/0094; H04B 17/328; H04W 72/23  
See application file for complete search history.

(56) References Cited

U.S. PATENT DOCUMENTS

2020/0045709 A1*  2/2020  Seo ................. H04W 72/53  
2020/0229161 A1   7/2020  Raghavan et al.  
(Continued)

FOREIGN PATENT DOCUMENTS

WO    2020205802 A1    10/2020  
WO    2020231834 A1    11/2020

OTHER PUBLICATIONS

3rd Generation Partnership Project; Technical Specification Group Radio Access Network; NR; Requirements for support of radio resource management (Release 16); 3GPP TS 38.133 V16.8.0 (Jun. 2021).

(Continued)

*Primary Examiner* — Luat Phung  
(74) *Attorney, Agent, or Firm* — Eschweiler & Potashnik, LLC; Matthew Glause

(57) ABSTRACT

Techniques discussed herein can facilitate the use of reference signals in active TCI switching. One example aspect is a user equipment (UE), comprising: a memory interface; and processing circuitry communicatively coupled to the memory interface and configured to: receive a physical downlink shared channel (PDSCH) message that includes an activation command indicating a target transmission configuration indicator (TCI) state; decode the activation command within a decoding period, where the decoding period is a time period allocated for the UE to decode the activation command; receive a TCI resource where the TCI resource is a reference signal; perform time and frequency tracking (Continued)

associated with the target TCI state according the TCI resource; and switch to the target TCI state after performing time and frequency tracking.

20 Claims, 6 Drawing Sheets

(56) References Cited

U.S. PATENT DOCUMENTS

| | | | | |
|---|---|---|---|---|
| 2020/0351129 | A1* | 11/2020 | Kwak | H04W 76/27 |
| 2021/0045141 | A1* | 2/2021 | Lee | H04L 5/0053 |
| 2021/0135821 | A1* | 5/2021 | Guan | H04L 5/0048 |
| 2021/0377825 | A1* | 12/2021 | Deenoo | H04W 36/0077 |
| 2022/0225385 | A1* | 7/2022 | Pezeshki | H04B 7/063 |
| 2022/0393831 | A1* | 12/2022 | Zhang | H04B 7/0695 |
| 2023/0318686 | A1* | 10/2023 | Kwak | H04B 7/088 455/101 |
| 2023/0328605 | A1* | 10/2023 | Farag | H04W 36/0072 |
| 2024/0178982 | A1* | 5/2024 | Matsumura | H04W 16/28 |

OTHER PUBLICATIONS

3rd Generation Partnership Project; Technical Specification Group Radio Access Network; NR; Physical layer procedures for control (Release 16); 3GPP TS 38.213 V16.6.0 (Jun. 2021).
3rd Generation Partnership Project; Technical Specification Group Radio Access Network; NR; Physical layer procedures for data (Release 16); 3GPP TS 38.214 V16.6.0 (Jun. 2021).
PCT Search Report and written Opinion dated Apr. 29, 2022 connection with PCT Application No. PCT/CN2021/111177.
Ericsson "On active TCI state switching in NR-U" 3GPP TSG-RAN WG4 Meeting #92-Bis; R4-1912084; Oct. 4, 2019.
European Extended Search Report Aug. 10, 2023 connection with EP Application No. 21921635.

* cited by examiner

REFERENCE SIGNALS IN ACTIVE TCI SWITCHING

This application is a National Phase entry application of International Patent Application No. PCT/CN2021/111177 filed Aug. 6, 2021, entitled "REFERENCE SIGNALS IN ACTIVE TCI SWITCHING", the contents of which are herein incorporated by reference in their entirety.

FIELD

The present disclosure relates to wireless technology including New Radio (NR) transmission configuration indicator (TCI) state switching including a system and method for active TCI state switching according to reference signals.

BACKGROUND

Mobile communication in the next generation wireless communication system, 5G, or new radio (NR) network will provide ubiquitous connectivity and access to information, as well as the ability to share data, around the globe. 5G networks and network slicing will be a unified, service-based framework, that will target to meet versatile, and sometimes conflicting, performance criteria. 5G networks will provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION

Figure 1:
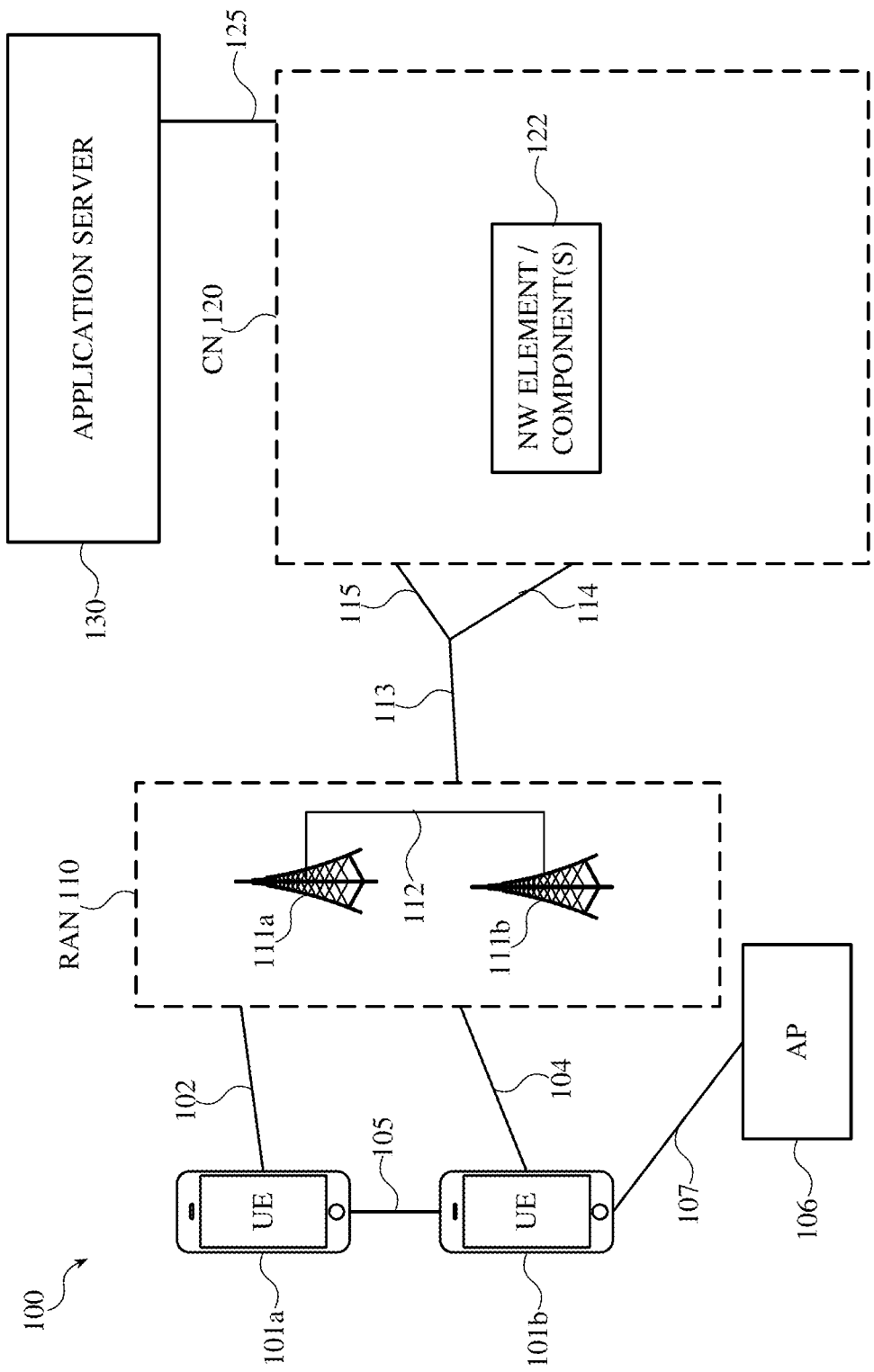
FIG. 1 is an exemplary block diagram illustrating an example of user equipment(s) (UEs) communicatively coupled to a network in accordance with various aspects described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

5G or NR networks may use a transmission configuration indication (TCI) state to configure quasi co-located (QCLed) relationships between network resources such as a reference signal (RS) and antenna ports. A base station (BS) of a network and user equipment (UE) can employ TCI state switching to make use of different resources from a serving cell. In some aspects, TCI state switching protocols involve preconfigured decoding and processing periods, as well as scheduled silence periods during which a UE is not required to receive DL data while waiting for synchronization signaling, for example synchronization signal blocks (SSB), to be used for time and frequency (T/F) tracking as part of the TCI state switching process. Unnecessarily long preconfigured decoding and processing periods, as well as scheduled silence periods, can lead to increased TCI state switching delays and lead to throughput losses during a TCI state switching period.

For example, a UE can receive a physical downlink shared channel (PDSCH) message from a BS that includes an activation command indicating a target TCI state. After receiving the first SSB after the allocated decoding period, the UE processes the first SSB. After waiting an SSB burst period the UE subsequently switches to the target TCI state. A silence period associated with the TCI state switching process is based on the SSB burst periodicity (e.g., 160 ms) and a time allocated for switching TCI states. Thus the timing of the switching of TCI states is determined based on the predetermined decoding period and the SSB periodicity. Similarly, the silence period is determined by the SSB periodicity.

When a UE is able to decode the activation command before the allocated decoding period expires, for example, in 1 ms, and receives a SSB before the designated SSB burst period expires, for example, in 5 ms, it would be possible for the UE to switch TCI states earlier. In this situation, the TCI state switching process incurs delays because the UE could have switched TCI states sooner and the UE and BS experience a reduction in throughput as DL data could be received earlier if the TCI state switching period completed sooner.

Various aspects of the present disclosure are directed towards utilizing different RSs in active TCI state switching. Mechanisms by which RSs are introduced earlier into the TCI state switching process to provide T/F tracking information to the UE thereby allowing the UE to complete the TCI state switching process sooner are presented.

In some aspects, the UE receives a TCI resource which can be a SSB or a RS after decoding the activation command. The RS can, for example, be a tracking reference signal (TRS), aperiodic reference signal (AP RS), or a channel state information reference signal (CSI-RS). The UE then performs T/F tracking associated with the target TCI state according to a first received resource determined by which of the SSB or reference signal was received first, and the TCI resource is the first received resource. Furthermore, once the UE receives the first received resource, the UE can process the resource and immediately begin T/F tracking without waiting for completion of the SSB burst period. In other aspects, the UE can be configured in a carrier aggregation (CA) mode with component carriers (CC). The UE can receive SSB and RS according to the component carriers and use the first resource as determined by which of the SSB or RS amongst the CCs are received first.

Additionally, when the UE decodes the activation command before the allocated decoding period expires, the UE can be configured to receive the TCI resource before the decoding period expires. In this situation, the TCI resource can be the SSB. As such, the UE does not have to wait for completion of the decoding period before receiving the TCI resource and beginning T/F tracking of the target TCI state according to the TCI resource.

According to the aspects above, the UE can complete TCI state switching in a more efficient manner with fewer delays when the activation command is decoded before expiration of the decoding period, and when the SSB or RS is received before expiration of the SSB burst period.

Additional aspects and details of the disclosure are further described below with reference to figures.

FIG. 1 illustrates example architecture of a wireless communication system 100 of a network that includes UE 101a and UE 101b (collectively referred to as "UEs 101" or "UE 101"), a radio access network (RAN) 110, and a core network (CN) 120. The UEs communicate with the CN 120 by way of the RAN 110. In aspects, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communication interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111a, 111b, 112, or other network nodes) that can be connected via non-ideal backhaul, one providing NR access and the other one providing either E-UTRA for LTE or NR access for 5G, for example.

Alternatively, or additionally, each of the UEs 101 can be configured in a CA mode where multiple frequency bands are aggregated amongst CCs to increase the data throughput between the UEs 101 and the nodes 111a, 111b. For example, UE 101a can communicate with node 111a according to the CCs in CA mode. Furthermore, UE 101a can communicate with nodes 112 in a DC mode simultaneously and additionally communicate with each node of nodes 112 in the CA mode.

In this example, the connections 102 and 104 are illustrated as an air interface to enable communicative coupling. In aspects, the UEs 101 can directly exchange communication data via a ProSe interface 105. The ProSe interface 105 can alternatively be referred to as a sidelink (SL) interface 105 and can comprise one or more logical channels.

The RAN 110 can include one or more access nodes or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth.

In aspects where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120.

The RAN 110 is shown to be communicatively coupled to a core network—in this aspect, CN 120. The CN 120 can comprise a plurality of network elements 122, which are configured to offer various data and telecommunication services to customers/subscribers (e.g., users of UEs 101) who are connected to the CN 120 via the RAN 110.

Reference Signals in Active TCI Switching

Figure 2:
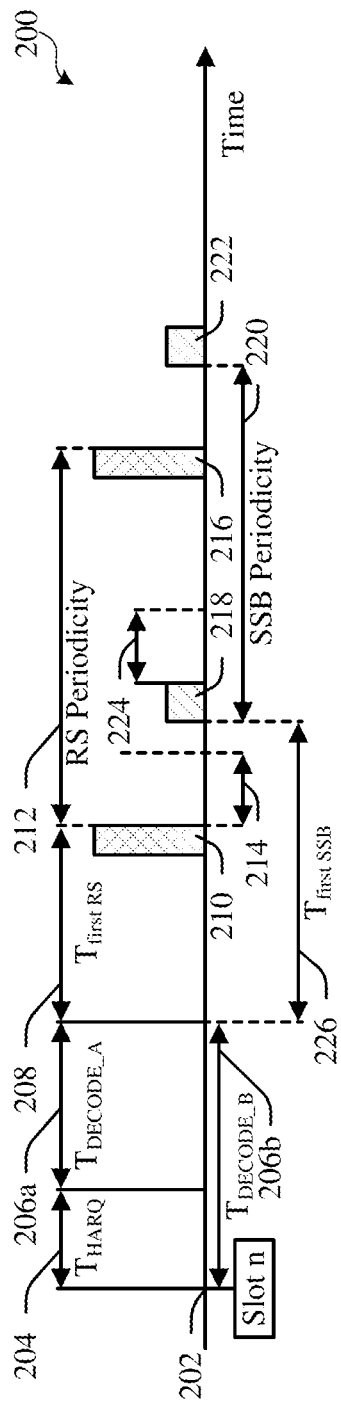
FIG. 2 is a timing diagram of an active transmission configuration indicator (TCI) switching using alternative reference signals for a known target TCI state based on reference signals, in accordance with various aspects disclosed herein.

FIG. 2 is a timing diagram 200 of an active TCI switching using alternative reference signals in for a known target TCI state, in accordance with various aspects disclosed herein. In some aspects, the wireless communication system 100 of FIG. 1 supports TCI state switching. At 202 the UE 101 receives a PDSCH message from a BS 111 carrying an activation command in Slot n. The activation command can be a medium access control control element (MAC CE) activation command or a radio resource control (RRC) activation command. The activation command can indicate a TCI state switch or a TCI state switch command. After receiving the PDSCH message from the BS 111, the UE 101 can receive a physical downlink control channel (PDCCH) message from the BS 111 indicating a target TCI state of a serving cell on which the TCI state switch occurs.

In some aspects, before receiving the PDSCH message, the UE 101 is already configured with requisite conditions to switch from the active TCI state to the target TCI state. In this case the target TCI state is a known target TCI state meaning that the UE 101 does not need to make a signal received power (RSRP) measurement for the target TCI state prior to switching to the target TCI state. The target TCI state can be a known target TCI state if a reference signal (RS) used for a previous layer 1 (L1)-RSRP measurement for the active TCI state is the same RS for the target TCI state. Alternatively, the target TCI state can be a known target TCI state if the RS used for the previous L1-RSRP measurement for the active TCI state is QCLed with the target TCI state. Additionally, when one or more of the following conditions are met, the target TCI state is a known target TCI state. The TCI state switch command is received within a designated period, for example, 1280 ms, after a most recent transmission of the RS resources associated with beam reporting or measurements of the L1-RSRP associated with the active TCI state. The UE 101 transmitted a L1-RSRP report associated with the target TCI state before receiving the TCI state switch command. The target TCI state is detectable during a TCI state switching period. If a SSB associated with the target TCI state is detectable during the TCI switching period and a signal to noise ratio (SNR) of the target TCI state is greater than or equal to −3 decibels (dB). Otherwise, the target TCI state is an unknown target TCI state. The TCI state switching depicted in FIG. 2 is for a known TCI state.

When the activation command is a MAC CE command, the UE 101 is allocated a hybrid automatic repeat request (HARQ) timing period 204 (also referred to as $T_{HARQ}$ 204) for the UE 101 to receive the activation command or downlink (DL) data which may include the activation command from the BS 111, and for the UE 101 to transmit an acknowledgment. A time allocated for the UE 101 to decode the MAC CE activation command is denoted by $T_{DECODE\_A}$ 206a. $T_{DECODE\_A}$ 206a occurs after $T_{HARQ}$ 204, and $T_{DECODE\_A}$ 206a can be equivalent to $3N_{slot}^{subframe,\mu}$ which is the time for the UE 101 to decode a MAC CE activation command. If the activation command is a RRC activation command, then no acknowledgement is necessary and an RRC decoding period $T_{DECODE\_B}$ 206b begins after completion of Slot n. $T_{DECODE\_B}$ 206b can be equivalent to $T_{RRC\_PROCESSING}$ which is the time for the UE 101 to decode a RRC activation command.

In some examples, $T_{DECODE\_A}$ 206a and $T_{DECODE\_B}$ 206b are a time period allocated for the UE 101 to decode an activation command. The decoding period may be, for example, 3 ms. The decoding period can be configured by the BS 111. Recall that while the UE 101 is allocated a decoding period for decoding the activation command (either MAC CE or RRC), the UE 101 may be able to decode the activation command well before expiration of the decoding period.

In some aspects, the UE 101 can receive PDCCH messages according to the active TCI state during a period defined by Slot n+$T_{HARQ}$ 204+$T_{DECODE\_A}$ 206a (associated with a MAC CE activation command) or Slot n+$T_{DECODE\_B}$ 206b (associated with an RRC activation command).

After $T_{DECODE\_A}$ 206a or $T_{DECODE\_B}$ 206b, the UE 101 receives a TCI resource which can be a first SSB 218 or a first RS 210 from the BS 111. In some situations, the TCI resource is determined by which of the first SSB 218 or the first RS 210 is received first. The first RS 210 can be one of a TRS, a CSI-RS, an AP RS, and AP RS CSI-RS, or other suitable RS. In some examples, the first RS 210 is not a SSB resource. When the first RS 210 is the AP RS, the BS 111 configures AP RS resources and sends the AP RS resources to the UE 101 prior to active TCI state switching. When the UE 101 receives the activation command for active TCI state switching, the BS 111 can schedule and transmit an associated AP RS for the target TCI for the UE 101.

The first SSB 218 or the first RS 210 can be QCLed with the target TCI state and provide the UE 101 the T/F tracking information needed to use the target TCI state. The BS 111 can configure a SSB periodicity 220 associated with a SSB interval by which the BS 111 will transmit SSB signaling for the target TCI state. For example, the SSB periodicity 220 can be the time between when the BS 111 sends the first SSB 218 and sending a second SSB 222. The BS 111 can configure a RS periodicity 212 (when the RS can be aperiodic, for example, if the RS is an AP RS, then the BS 111 would not configure a RS periodicity 212) associated with a RS interval by which the BS 111 will transmit RS signaling for the target TCI state. For example, the RS periodicity 212 can be the time between when the BS 111 sends the first RS 210 and sending a second RS 216. Furthermore, the first SSB 218, second SSB 222, first RS 210, and second RS 216 are QCLed with the target TCI state in either a QCL-TypeA, QCL-TypeB, QCL-TypeC, or QCL-TypeD. $T_{first\_RS}$ 208 denotes a time from completing $T_{DECODE\_A}$ 206a or $T_{DECODE\_B}$ 206b to receiving the first RS 210. $T_{first\_SSB}$ 226 denotes a time from completing $T_{DECODE\_A}$ 206a or $T_{DECODE\_B}$ 206b to receiving the first SSB 218. While FIG. 2 depicts the first RS 210 arriving before the first SSB 218, it is to be appreciated that the first SSB 218 could arrive before the first RS 210. Thus, when the first RS 210 arrives before the first SSB 218, the TCI resource is the first RS 210. Alternatively, when the SSB 218 arrives before the first RS 210, the TCI resource is the first SSB 218.

The UE 101 performs T/F tracking on the TCI resource. A time from when the first RS 210 is received until when the first RS 210 is processed is denoted as $T_{RS\_proc}$ 214. A time from when the first SSB 218 is received until when the first SSB 218 is processed is denoted as $T_{SSB\_proc}$ 224. For example, TRS proc 214 and $T_{SSB\_proc}$ 224 could each be 2 ms. When the UE 101 performs T/F tracking according to the TCI resource, and the first RS 210 is received before the first SSB 218, TCI switching to the target TCI state is complete after TRS proc 214. In contrast, when the UE 101 performs T/F tracking according to the TCI resource, and the first SSB 218 is received before the first RS 210, TCI switching to the target TCI state is complete after $T_{SSB\_proc}$ 224. In some aspects, when the UE 101 receives the first received resource, no other TCI resource is received. That is, when the UE 101 receives the first SSB 218 before the first RS 210, the UE 101 may not receive the first SSB 218 and the BS 111 may not send the first SSB 218. Alternatively, when the UE 101 receives the first RS 210 before the first SSB 218, the UE 101 may not receive the first RS 210 and the BS 111 may not send the first RS 210.

In some aspects, the UE 101 is configured to communicate with the BS 111 in a CA mode with a plurality of CCs. As such, the UE 101 can receive a plurality of SSB or a plurality of RS from the BS 111 according to the plurality of CCs. Furthermore, the plurality of CCs can be of a same band or of a common beam management (CBM). In this aspect, the first received resource is determined by a one of the plurality of SSB or a one of the plurality of RS that was received first amongst the plurality of CCs and the TCI signaling is the first received resource. For example, the first SSB 218 is a first arrived SSB of the plurality of SSB received from the plurality of CCs or the first RS 210 is a first arrived RS of the plurality of SSB received from the plurality of CCs. In some situations, the TCI signaling is determined by a one of the plurality of reference signals that was received first amongst the plurality of CCs.

When the activation command is the MAC CE activation command, and the UE 101 performs T/F tracking on the first received resource, the UE 101 can receive a PDCCH message from the BS 111 according to the target TCI state after a time defined by:

Slot $n+T_{HARQ}204+T_{DECODE\_A}206a+TO_k^*(\min(T_{first\_SSB}226,T_{first\_RS}208)+T_{proc})$/NR slot length Where $TO_k$ is 1 when the target TCI state is in an active TCI state list for PDSCH and 0 otherwise. $T_{proc}$ is a processing time of the first received resource, for example, TRS proc 214 or $T_{SSB\_proc}$ 224. $\min(T_{first\_SSB}$ 226, $T_{first\_RS}$ 208) is determined by which of the first RS 210 or the first SSB 218 is received first. NR slot length is associated with a slot length. Furthermore, a scheduled silence period for the known target TCI state is from Slot n+$T_{HARQ}$ 204+$T_{DECODE\_A}$ 206a until Slot n+$T_{HARQ}$ 204+$T_{DECODE\_A}$ 206a+$TO_k^*(\min(T_{first\_SSB}$ 226, $T_{first\_RS}208)+T_{proc})$/NR slot length. During the scheduled silence period for the known target TCI state, the UE 101 is not required to receive DL data.

In some situations, the activation command is the MAC CE activation command and the UE 101 performs T/F tracking on the TCI resource where the TCI resource is the reference signal, the UE 101 can receive the PDCCH message from the BS 111 according to the target TCI state after a time defined by:

Slot $n+T_{HARQ}204+T_{DECODE\_A}206a+TO_k*$
$(T_{first\ RS}208+T_{RS\ proc}214)/NR$ slot length Where the scheduled silence period for the known target TCI state is from Slot $n+T_{HARQ}$ 204$+T_{DECODE\_A}$ 206a until Slot $n+T_{HARQ}$ 204$+T_{DECODE\_A}$ 206a$+TO_k*(T_{first\ RS}$ 208$+T_{RS\ proc}$ 214$)/NR$ slot length.

When the activation command is the RRC activation command, and the UE 101 performs T/F tracking on the first received resource, the UE 101 can receive a PDCCH message from the BS 111 according to the target TCI state after a time defined by:

Slot $n+(T_{DECODE\_B}206b+TO_k*(\min(T_{first\ SSB}$
$226,T_{first\ RS}208)+T_{proc}))/NR$ slot length Furthermore, a scheduled silence period for the known target TCI state is from Slot $n+T_{DECODE\_A}$ 206a/NR slot length until Slot $n+(T_{DECODE\_B}$ 206b$+TO_k*(\min(T_{first\ SSB}$ 226, $T_{first\ RS}$ 208$)+T_{proc}))/NR$ slot length.

In some situations, the activation command is the RRC activation command and the UE 101 performs T/F tracking on the TCI resource where the TCI resource is the reference signal, the UE 101 can receive the PDCCH message from the BS 111 according to the target TCI state after a time defined by:

Slot $n+(T_{DECODE\_B}206b+TO_k*(T_{first\ RS}208+$
$T_{RS\ proc}214))/NR$ slot length Where the scheduled silence period for the known target TCI state is from Slot $n+(T_{DECODE\_A}$ 206a/NR slot length) until Slot $n+(T_{DECODE\_B}$ 206b$+TO_k*(T_{first\ RS}$ 208$+T_{RS\ proc}$ 214$))/$ NR slot length.

According to the known target TCI state aspects described above, the UE 101 can complete TCI state switching in an efficient manner where delays are minimized in the TCI state switching process thus minimizing throughput losses.

Figure 3:
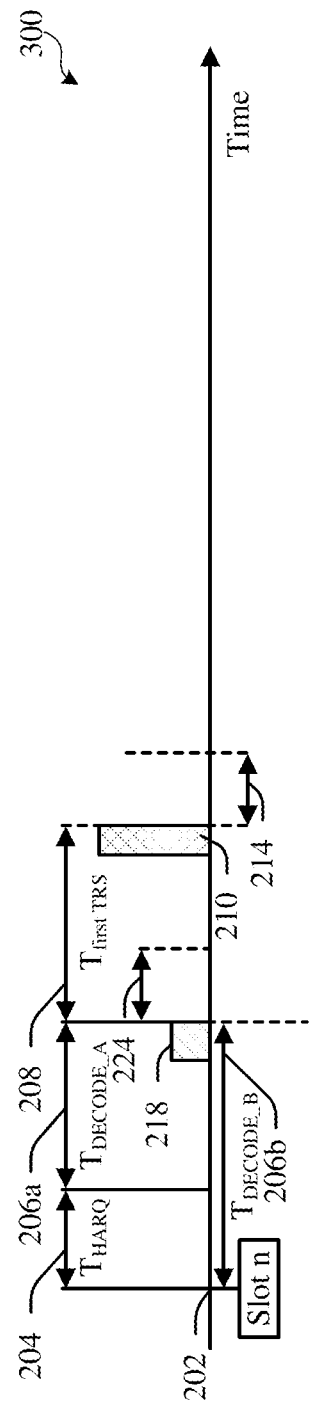
FIG. 3 is a timing diagram of an example active transmission configuration indicator (TCI) switching using an alternative reference signal for a known target TCI state, in accordance with various aspects disclosed herein.

FIG. 3 is a timing diagram 300 of an example active TCI switching using an alternative reference signal for a known target TCI state, in accordance with various aspects disclosed herein. The timing diagram 300 describes additional or alternative operations that occur during the $T_{DECODE\_A}$ 206a or $T_{DECODE\_B}$ 206b and alternative features of the first SSB 218.

In some aspects $T_{DECODE\_A}$ 206a or $T_{DECODE\_B}$ 206b is the decoding period for the UE 101 to decode the activation command where the decoding period is preconfigured, for example, 3 ms. The UE 101 can decode the activation command before $T_{DECODE\_A}$ 206a or $T_{DECODE\_B}$ 206b expires. In this situation, the UE 101 can be configured to receive the first SSB 218 from the BS 111 prior to completion of $T_{DECODE\_A}$ 206a or $T_{DECODE\_B}$ 206b. Thus the first SSB 218 is received before the first RS 210. In the example illustrated in FIG. 3, the UE 101 performs the T/F tracking according to the first received resource and the first received resource is the first SSB 218. Accordingly, since the UE 101 can receive the first SSB 218 before completion of $T_{DECODE\_A}$ 206a or $T_{DECODE\_B}$ 206b and the TCI switching delay is reduced and communication throughput is improved. In an alternative aspect, the UE 101 receives the first RS 210 from the BS 111 prior to completion of $T_{DECODE\_A}$ 206a or $T_{DECODE\_B}$ 206b, and the first RS 210 is received before the first SSB 218. In this aspect, the first received resource is the first RS 210.

Figure 4:
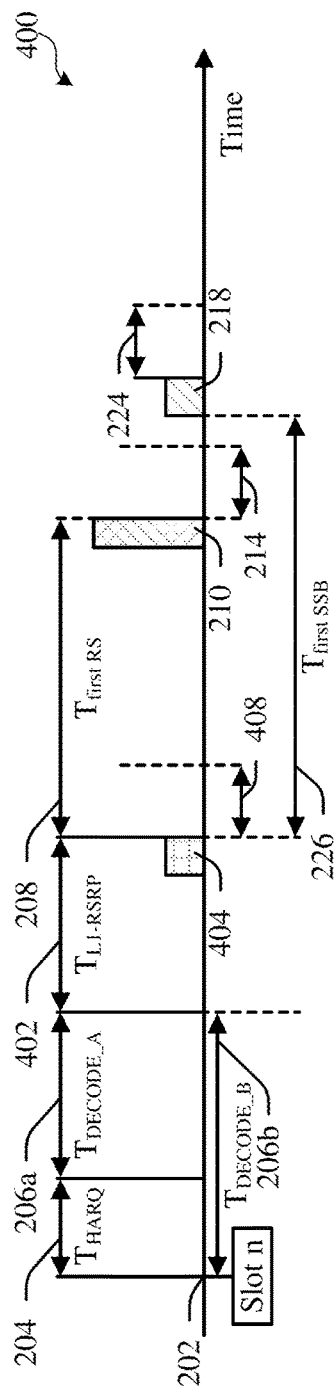
FIG. 4 is a timing diagram of an example active transmission configuration indicator (TCI) switching using an alternative reference signal for an unknown target TCI state, in accordance with various aspects disclosed herein.

FIG. 4 is a timing diagram 400 of an example active TCI switching using an alternative reference signal for an unknown target TCI state, in accordance with various aspects disclosed herein. The timing diagram 400 describes additional or alternative operations or features with regard to L1-RSRP measurements, $T_{first\ RS}$ 208, and $T_{first\ SSB}$ 226.

Timing diagram 400 shows an example where the conditions of the target TCI state are unknown, and thus the target TCI state is an unknown target TCI state. To complete the TCI state switching process with the unknown target TCI state, the UE 101 determines relevant beam information associated with the target TCI state. After the UE 101 completes $T_{DECODE\_A}$ 206a or $T_{DECODE\_B}$ 206b, the UE 101 can conduct L1-RSRP beam measurements for the target TCI to determine a receive (Rx) beam associated with the target TCI. A time period for the UE 101 to perform the L1-RSRP beam measurements is $T_{L1\text{-}RSRP}$ 402. After $T_{L1\text{-}RSRP}$ 402, the UE 101 determines the Rx beam associated with the target TCI which is QCLed with the first RS 210 or the first SSB 218.

The UE 101 can receive the first RS 210 or the first SSB 218 after $T_{L1\text{-}RSRP}$ 402. In this example, $T_{first\ RS}$ 208 denotes a time from completing $T_{L1\text{-}RSRP}$ 402 to receiving the first RS 210 and $T_{first\ SSB}$ 226 denotes a time from completing $T_{L1\text{-}RSRP}$ 402 to receiving the first SSB 218.

When the activation command is the MAC CE activation command, and the UE 101 performs T/F tracking on the first received resource when the target TCI state is unknown, the UE 101 can receive a PDCCH message from the BS 111 according to the target TCI state after a time defined by:

Slot $n+T_{HARQ}204+T_{DECODE\_A}206a+T_{L1\text{-}RSRP}402+$
$TO_k*(\min(T_{first\ SSB}226,T_{first\ RS}208)+T_{proc})/NR$
slot length Furthermore, a scheduled silence period for the known target TCI state is from Slot $n+T_{HARQ}$ 204$+T_{DECODE\_A}$ 206a until Slot $n+T_{HARQ}$ 204$+T_{DECODE\_A}$ 206a$+T_{L1\text{-}RSRP}$ 402$+TO_k*$ $(\min(T_{first\ SSB}$ 226, $T_{first\ RS}$ 208$)+T_{proc})/NR$ slot length. During the scheduled silence period for the known target TCI state, the UE 101 is not required to receive DL data.

In some situations, the activation command is the MAC CE activation command and the UE 101 performs T/F tracking on the TCI resource where the TCI resource is the reference signal, the UE 101 can receive the PDCCH message from the BS 111 according to the target TCI state after a time defined by:

Slot $n+T_{HARQ}204+T_{DECODE\_A}206a+T_{L1\text{-}RSRP}402+$
$TO_k*(T_{first\ RS}208+T_{RS\ proc}214)/NR$ slot length Where the scheduled silence period for the known target TCI state is from Slot $n+T_{HARQ}$ 204$+T_{DECODE\_A}$ 206a until Slot $n+T_{HARQ}$ 204$+T_{DECODE\_A}$ 206a$+T_{L1\text{-}RSRP}$ 402$+TO_k*$ $(T_{first\ RS}$ 208$+T_{RS\ proc}$ 214$)/NR$ slot length.

When the activation command is the RRC activation command, and the UE 101 performs T/F tracking on the first received resource when the target TCI state is unknown, the UE 101 can receive a PDCCH message from the BS 111 according to the target TCI state after a time defined by:

Slot $n+(T_{DECODE\_B}206b/NR$ slot length$)+T_{L1\text{-}RSRP}$
$402+TO_k*(\min(T_{first\ SSB}226,T_{first\ RS}208)+T_{proc})/$
NR slot length Furthermore, a scheduled silence period for the known target TCI state is from Slot $n+(T_{DECODE\_B}$ 206b/NR slot length) until Slot $n+(T_{DECODE\_B}$ 206b/NR slot length$)+T_{L1\text{-}RSRP}$ 402$+TO_k*(\min(T_{first\ SSB}$ 226, $T_{first\ RS}$ 208$)+T_{proc})/NR$ slot length.

In some situations, the activation command is the RRC activation command and the UE 101 performs T/F tracking on the TCI resource where the TCI resource is the reference signal, the UE 101 can receive the PDCCH message from the BS 111 according to the target TCI state after a time defined by:

$$\text{Slot } n+(T_{DECODE\_B}206b/\text{NR slot length})+T_{L1\text{-}RSRP}402+TO_k^*(T_{first\_RS}208+T_{RS\_proc}214)/\text{NR slot length}$$

Where the scheduled silence period for the known target TCI state is from Slot n+($T_{DECODE\_A}$ 206a/NR slot length) until Slot n+($T_{DECODE\_B}$ 206b/NR slot length)+$T_{L1\text{-}RSRP}$ 402+$TO_k^*$($T_{first\_RS}$ 208+$T_{RS\_proc}$ 214)/NR slot length.

In an alternative aspect, the UE 101 can receive the first received resource during $T_{L1\text{-}RSRP}$. In this example, the UE 101 receives a first CSI-RS 404 associated with the target TCI state during L1-RSRP measurements, and the first CSI-RS 404 is the first received resource used for active TCI switching. The first CSI-RS 404 provides the UE 101 with T/F tracking information needed to use the target TCI state. A time from when the first CSI-RS 404 is received until when the first CSI-RS 404 is processed is $T_{CSI\text{-}RS\_proc}$ 408 and the TCI state switching process can be completed when $T_{CSI\text{-}RS\_proc}$ 408 is completed. When the UE 101 performs T/F tracking according to the first received resource (e.g. CSI-RS), then $T_{L1\text{-}RSRP}$ 402+$TO_k^*$(min($T_{first\_SSB}$ 226, $T_{first\_RS}$ 208)+$T_{proc}$) is replaced with $T_{L1\text{-}RSRP}$ 402+$TO_k^*T_{CSI\text{-}RS\_proc}$ 408.

In an alternative aspect, the first RS 210 is the AP RS. In this scenario, the BS 111 configures AP RS resources and transmits the AP RS resources to the UE 101 prior to active TCI state switching. Subsequently, the BS 111 configures AP RS. When the UE 101 receives the activation command for active TCI state switching, the BS 111 schedules and transmits an associated AP RS for the target TCI to the UE 101. The UE 101 can then use the associated AP RS to perform L1-RSRP measurements for the target TCI state. The BS 111 could also indicate to the UE 101, prior to active TCI state switching, if the UE 101 should perform L1-RSRP based on the SSB or RS (e.g. AP RS, AP CSI, or SSB) QCLed with the target TCI. Furthermore, the AP CSI for L1-RSRP is QCLed with the SSB for L1-RSRP, for example, QCLed type D. Thus, when the first RS 210 is the AP RS, the UE 101 can perform L1-RSRP measurements according to the AP RS, or according to the SSB. As such, $T_{L1\text{-}RSRP}$ 402 can be the period to complete RSRP measurements according to the AP RS denoted as $T_{L1\text{-}RSRP\_AP\_RS}$ or according to the SSB denoted as $T_{L1\text{-}RSRP\_SSB}$, based on which of the $T_{L1\text{-}RSRP\_AP\_RS}$ or $T_{L1\text{-}RSRP\_SSB}$ is completed first or indicated by the BS 111. In this scenario, the UE 101 can receive a PDCCH message from the BS 111 according to the TCI state after a time defined by the equations above for the MAC CE activation command and RRC activation command where $T_{L1\text{-}RSRP}$, is replaced with min($T_{L1\text{-}RSRP\_AP\_RS}$, $T_{L1\text{-}RSRP\_SSB}$). The same replacement applies for a scheduled silence period for this scenario.

According to the aspects above, the UE 101 can complete TCI state switching in an efficient manner for the unknown target TCI state when the activation command is decoded before expiration of the decoding period.

Figure 5:
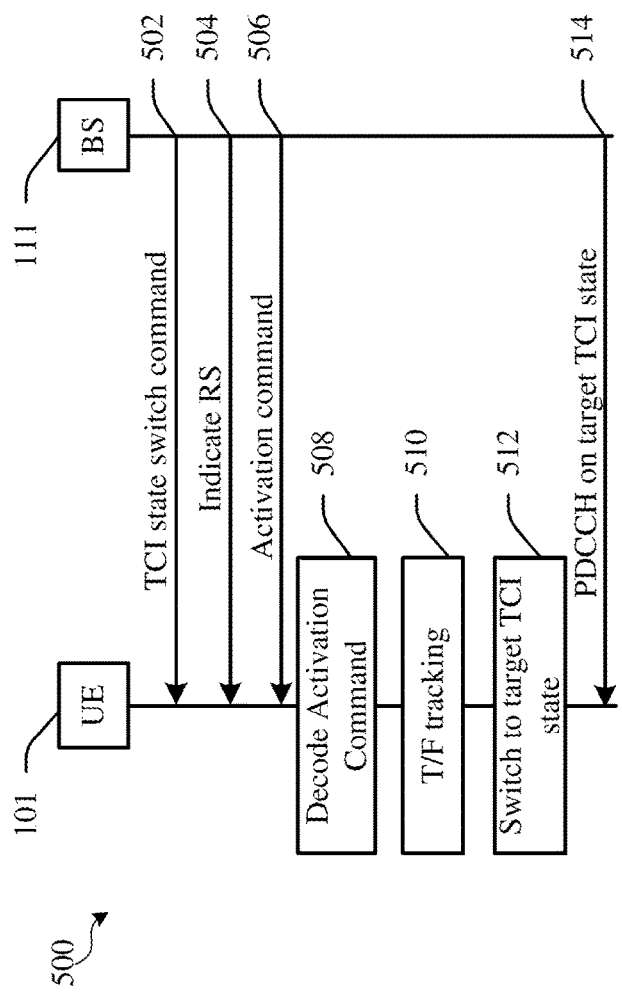
FIG. 5 is a signal flow diagram outlining an example of active transmission configuration indicator (TCI) switching using an alternative reference signal.

FIG. 5 is a signal flow diagram 500 outlining an example of active TCI switching using an alternative reference signal.

Signal flow diagram 500 shows that the BS 111 indicates a TCI state switch command to the UE 101 at 502. The TCI state switch command can be indicated in a RRC message. The BS 111 indicates a RS associated with the target TCI state (e.g. TRS or AP RS) at 504 in the RRC message, a different RRC message, a layer 1 (L1) downlink control information (DCI) signaling, or other indication type. It is noted that the BS 111 can indicate the TCI state switch command and the RS in any order. In this scenario, the RS is analogous to the first received resource of or the first resource, for example, any of FIGS. 2-4. At 506, the BS 111 can activate the RS by transmitting an activation command, for example, the MAC CE activation command or RRC activation command of FIG. 2, a different MAC CE or RRC message, or a L1 DCI signaling. Activating the RS can include indicating to the UE 101 that the UE 101 can use the RS for T/F tracking associated with the target TCI state.

The UE 101 decodes the activation command at 508. When the UE 101 completes decoding the activation command at 508, which can be analogous to $T_{DECODE\_A}$ 206a or $T_{DECODE\_B}$ 206b of FIGS. 2 and 4, the UE 101 performs T/F tracking on the RS at 510 and switches to the target TCI state at 512 upon completion of the T/F tracking. As such, the UE 101 does not perform T/F tracking on other resources besides the RS associated with the target TCI state and completes the active TCI state switching process with minimal delay. In some scenarios, prior to the activation command, the UE 101 does not monitor the RS associated with the target TCI state and only monitors a RS associated with the active TCI state. After switching to the target TCI state, the UE 101 can receive PDCCH on the target TCI state at 514.

Figure 6:
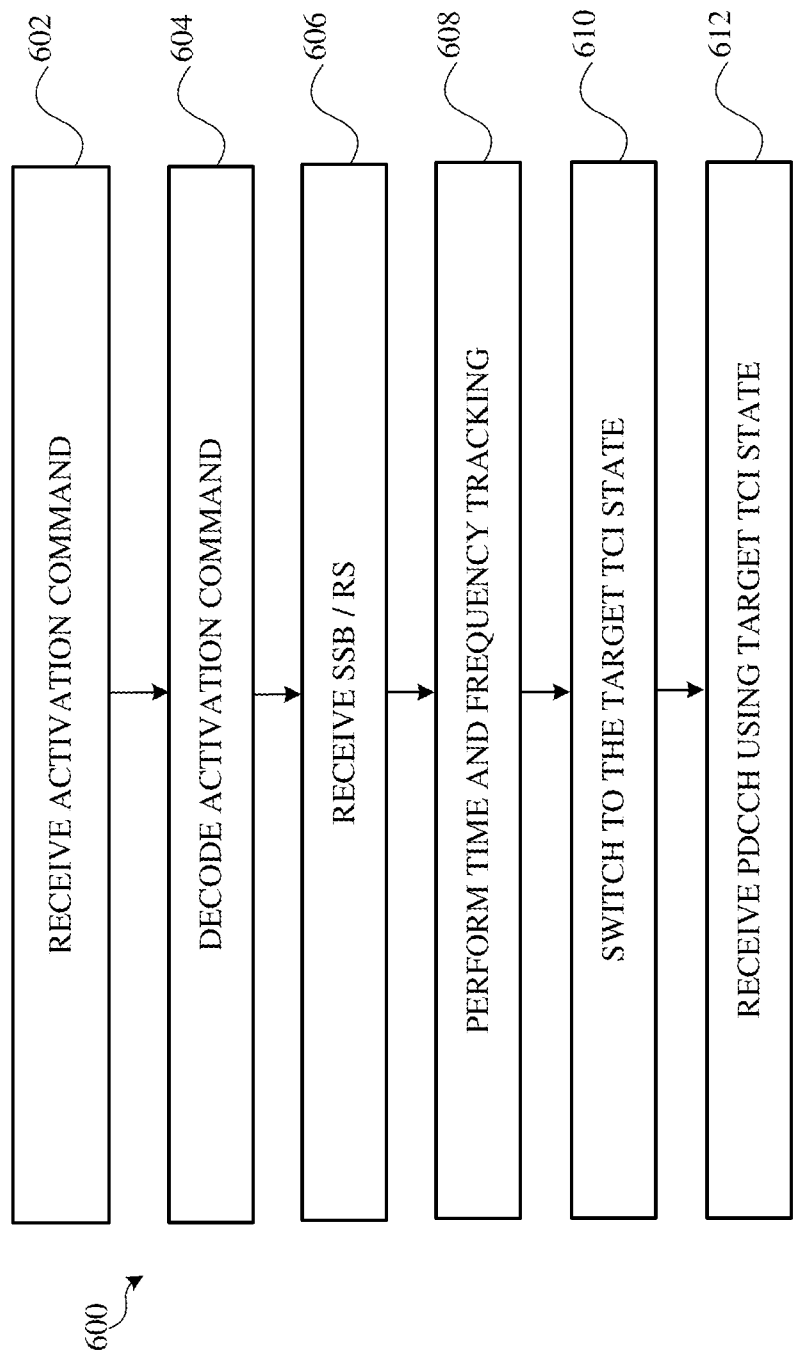
FIG. 6 illustrates a flow diagram of an example method for active transmission configuration indicator (TCI) switching using alternative reference signals.

FIG. 6 illustrates a flow diagram of an example method 600 for active TCI switching using alternative reference signals. The example method 600 may be performed, for example by the UE 101 of FIGS. 1-5.

At 602, the method includes receiving an activation command indicating a target TCI state. FIG. 2 at 202, FIG. 3 at 202, FIG. 4 at 202, and FIG. 5 at 506 correspond to some aspects of act 602.

At 604, the method includes decoding the activation command. $T_{DECODE\_A}$ 206a or $T_{DECODE\_B}$ 206b of FIGS. 2-4, and FIG. 5 at 508 correspond to some aspects of act 604.

At 606, the method includes receiving a TCI resource which can be a SSB or a RS. First RS 210 and first SSB 218 of FIGS. 2-4, and FIG. 5 at 504 correspond to some aspects of act 606.

At 608, the method includes performing T/F tracking associated with the target TCI state according to the TCI resource. First RS 210, $T_{RS\_proc}$ 214, first SSB 218, and $T_{SSB\_proc}$ 224 of FIGS. 2-4, and FIG. 5 at 510 correspond to some aspects of act 608.

At 610, the method includes switching to the target TCI state after performing T/F tracking associated with the target TCI state. Acts described in FIGS. 2-4 and FIG. 5 at 512 correspond to some aspects of act 610.

At 612, the method includes receiving PDCCH messaging using the target TCI state. Acts described in FIGS. 2-4 and FIG. 5 at 514 correspond to some aspects of act 612.

Figure 7:
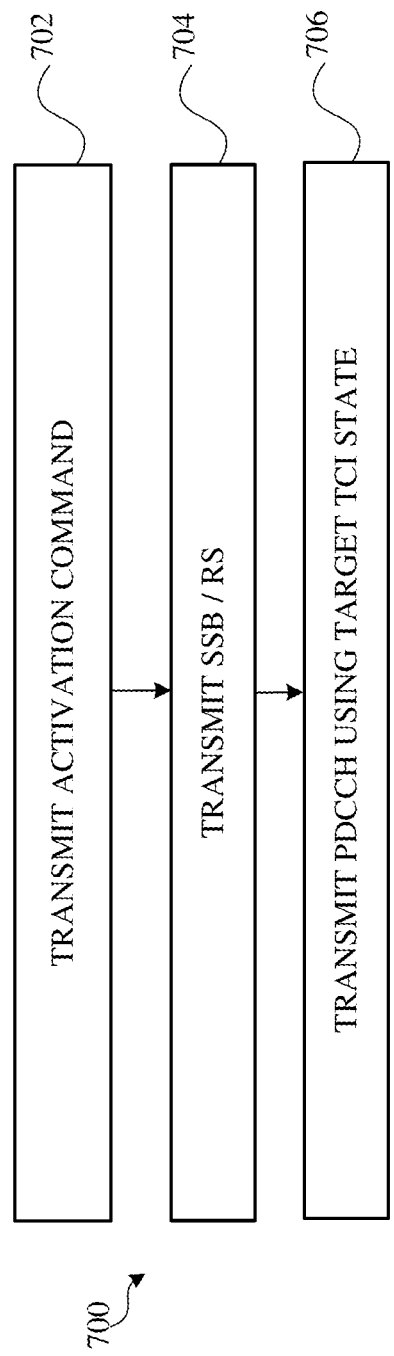
FIG. 7 illustrates a flow diagram of an example method for active transmission configuration indicator (TCI) switching using alternative reference signals.

FIG. 7 illustrates a flow diagram of an example method 700 for active TCI switching using alternative reference signals. The example method 700 may be performed, for example by the BS 111 of FIGS. 1-5.

At 702, the method includes transmitting an activation command associated with a target TCI state. FIG. 2 at 202, FIG. 3 at 202, FIG. 4 at 202, and FIG. 5 at 506 correspond to some aspects of act 702.

At 704, the method includes transmitting a TCI resource which can be a SSB or a RS. First RS 210 and first SSB 218 of FIGS. 2-4, and FIG. 5 at 504 correspond to some aspects of act 606.

At 706, the method includes transmitting a PDCCH message using the target TCI state. Acts described in FIGS. 2-4 and FIG. 5 at 514 correspond to some aspects of act 612.

Figure 8:
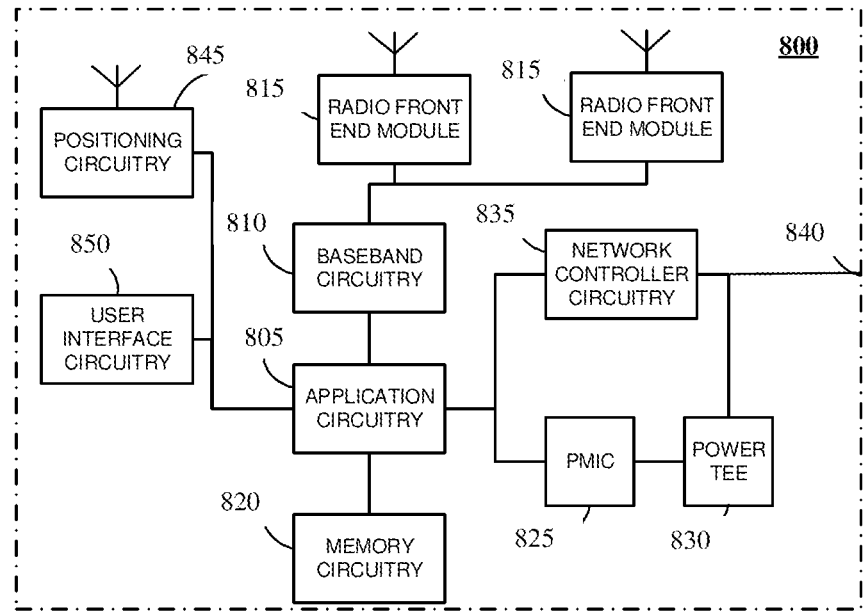
FIG. 8 illustrates an example of an infrastructure equipment, in accordance with various aspects disclosed.

FIG. 8 illustrates an example of infrastructure equipment 800 in accordance with various aspects. The infrastructure equipment 800 (or "system 800") may be implemented as a base station, radio head, RAN node such as the BS 111 of FIG. 1 and/or any other element/device discussed herein. In other examples, the system 800 could be implemented in or by a UE such as UE 101.

The system 800 includes application circuitry 805, baseband circuitry 810, one or more radio front end modules (RFEMs) 815, memory circuitry 820 (including a memory interface), power management integrated circuitry (PMIC) 825, power tee circuitry 830, network controller circuitry 835, network interface connector 840, satellite positioning circuitry 845, and user interface 850. In some aspects, the device 800 may include additional elements such as, for example, memory/storage, display, camera, sensor, or input/output (I/O) interface. In other aspects, the components described below may be included in more than one device. For example, said circuitries may be separately included in more than one device for CRAN, vBBU, or other like implementations.

Application circuitry 805 includes circuitry such as, but not limited to one or more processors (or processor cores), processing circuitry, cache memory, and one or more of low drop-out voltage regulators (LDOs), interrupt controllers, serial interfaces such as SPI, IA2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 805 may comprise, or may be, a special-purpose processor/controller to operate according to the various aspects herein. As examples, the processor(s) of application circuitry 805 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 800 may not utilize application circuitry 805, and instead may include a special-purpose processor/controller to process IP data received from an EPC or 5GC, for example.

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 8 may communicate with one another using interface circuitry, that is communicatively coupled to one another, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 9:
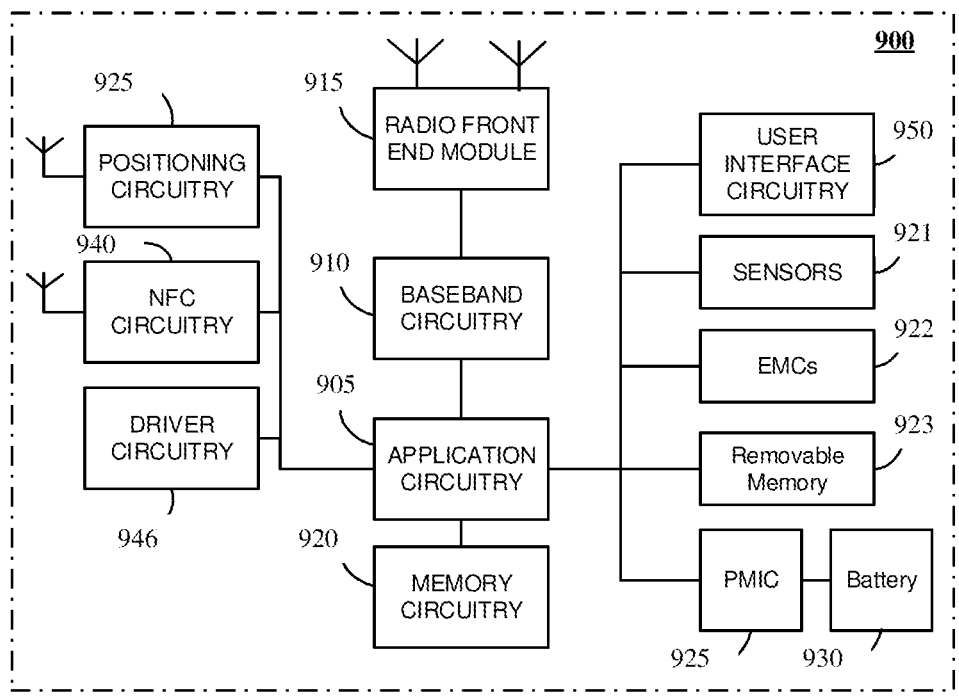
FIG. 9 illustrates an example of a user equipment (UE) platform, in accordance with various aspects disclosed.

FIG. 9 illustrates an example of a platform 900 (or "device 900") in accordance with various aspects. In aspects, the computer platform 900 may be suitable for use as the UE 101 of FIG. 1, and/or any other element/device discussed herein. The platform 900 may include any combinations of the components shown in the example. The components of platform 900 may be implemented as integrated circuits (ICs), portions thereof, discrete electronic devices, or other modules, logic, hardware, software, firmware, or a combination thereof adapted in the computer platform 900, or as components otherwise incorporated within a chassis of a larger system. The block diagram of FIG. 9 is intended to show a high level view of components of the computer platform 900. However, some of the components shown may be omitted, additional components may be present, and different arrangement of the components shown may occur in other implementations.

Application circuitry 905 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 905 may include a general or special purpose processor, such as an A-series processor (e.g., the A13 Bionic), available from Apple® Inc., Cupertino, CA or any other such processor. The processors of the application circuitry 905 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 905 may be a part of a system on a chip (SoC) in which the application circuitry 905 and other components are formed into a single integrated circuit, or a single package.

The baseband circuitry or processor 910 may be implemented, for example, as a solder-down substrate including one or more integrated circuits, a single packaged integrated circuit soldered to a main circuit board or a multi-chip module containing two or more integrated circuits. Furthermore, the baseband circuitry or processor 910 may cause transmission of various resources.

The platform 900 may also include interface circuitry (not shown) that is used to connect external devices with the platform 900. The interface circuitry may communicatively couple one interface to another. The external devices connected to the platform 900 via the interface circuitry include sensor circuitry 921 and electro-mechanical components (EMCs) 922, as well as removable memory devices coupled to removable memory circuitry 923.

A battery 930 may power the platform 900, although in some examples the platform 900 may be mounted deployed in a fixed location, and may have a power supply coupled to an electrical grid. The battery 930 may be a lithium ion battery, a metal-air battery, such as a zinc-air battery, an aluminum-air battery, a lithium-air battery, and the like. In some implementations, such as in V2X applications, the battery 930 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to aspects and examples described herein.

Example 1 is a user equipment (UE), comprising: a memory interface; and processing circuitry communicatively coupled to the memory interface and configured to: receive a physical downlink shared channel (PDSCH) message that includes an activation command indicating a target transmission configuration indicator (TCI) state; decode the activation command within a decoding period, wherein the decoding period is a time period allocated for the UE to decode the activation command; receive a TCI resource wherein the TCI resource is a reference signal; perform time and frequency tracking associated with the target TCI state according the TCI resource; and switch to the target TCI state after performing time and frequency tracking.

Example 2 comprises the subject matter of example 1, wherein the reference signal is not a synchronization signal block (SSB).

Example 3 comprises the subject matter of example 1, wherein the activation command is a medium access control control element (MAC CE) activation command.

Example 4 comprises the subject matter of example 1, wherein the activation command is a radio resource control (RRC) activation command.

Example 5 comprises the subject matter of example 1, wherein the TCI resource is received after decoding the activation command and before expiration of the decoding period, and the TCI resource is the reference signal or a synchronization signal block (SSB).

Example 6 comprises the subject matter of example 1, further configured to, after decoding the activation command: perform reference signal receive power (RSRP) measurements associated with the target TCI state; and receive the TCI resource after decoding the activation command and according to the RSRP measurements.

Example 7 comprises the subject matter of example 6, further configured to determine a best receive (Rx) beam for use with the target TCI state based on the RSRP measurements.

Example 8 comprises the subject matter of any of examples 1-7, further configured to receive a plurality of TCI resources according to a plurality of component carriers (CCs) wherein the plurality of CCs are of a same band or of a common beam management (CBM); and the TCI resource is determined by a one of the plurality of TCI resources that was received first amongst the plurality of CCs.

Example 9 comprises the subject matter of any of examples 1-7, wherein the reference signal is a tracking reference signal (TRS) or aperiodic reference signal (AP RS).

Example 10 comprises the subject matter of example 1, wherein the TCI resource is the reference signal or a synchronization signal block (SSB) determined by which of the reference signal or SSB is received first.

Example 11 comprises the subject matter of example 10, wherein the UE is further configured to receive a physical downlink control channel (PDCCH) message according to the target TCI state after a time defined by: a slot $n+T_{HARQ}+3N_{slot}^{subframe,\mu}+TO_k*(\min(T_{first\ SSB}, T_{first\ RS})+T_{proc})$/NR slot length wherein $T_{HARQ}$ corresponds to a timing between a downlink (DL) data transmission and an acknowledgement; $3N_{slot}^{subframe,\mu}$ corresponds to the decoding period; $TO_k$ is 1 when the target TCI state is in an active TCI state list for PDSCH and 0 otherwise; $T_{first\ SSB}$ is associated with a reception time of the SSB; $T_{first\ TRS}$ is associated with a reception time of the reference signal; $\min(T_{first\ SSB}, T_{first\ RS})$ is determined by which of the reference signal or SSB is received first; $T_{proc}$ is associated with a processing time of the $T_{first\ SSB}$ or a processing time of the $T_{first\ RS}$, according to which of the reference signal or SSB is received first; and NR slot length is associated with a slot length.

Example 12 comprises the subject matter of example 11, further configured to, after decoding the activation command: perform reference signal receive power (RSRP) measurements associated with the target TCI state; and receive the TCI resource after decoding the activation command and according to the RSRP measurements.

Example 13 comprises the subject matter of example 12, further configured to receive a physical downlink control channel (PDCCH) message according to the target TCI state after: a slot $n+T_{HARQ}+3N_{slot}^{subframe,\mu}+T_{L1-RSRP}+TO_k*(\min(T_{first\ SSB}, T_{first\ RS})+T_{proc})$/NR slot length wherein $T_{L1-RSRP}$ is associated with a time to perform the RSRP measurements.

Example 14 comprises the subject matter of example 12, further configured to receive a physical downlink control channel (PDCCH) message according to the target TCI state after: a slot $n+T_{HARQ}+3N_{slot}^{subframe,\mu}+\min(T_{L1-RSRP\ AP\ RS}, T_{L1-RSRP\ SSB})+TO_k*(\min(T_{first\ SSB}, T_{first\ RS})+T_{proc})$/NR slot length wherein $T_{L1-RSRP\ AP\ RS}$ is associated with a time to complete RSRP measurements according to an aperiodic resource signal (AP RS); and $T_{L1-RSRP\ SSB}$ is associated with a time to complete RSRP measurements according to an SSB.

Example 15 comprises the subject matter of example 10, wherein the UE is further configured to receive a physical downlink control channel (PDCCH) message according to the target TCI state after a time defined by: a slot $n+(T_{RRC\_PROCESSING}$/NR slot length$)+TO_k*(\min(T_{first\ SSB}, T_{first\ RS})+T_{proc})$/NR slot length wherein $T_{RRC\_PROCESSING}$ corresponds to the decoding period; $TO_k$ is 1 when the target TCI state is in an active TCI state list for PDSCH and 0 otherwise; $T_{first\ SSB}$ is associated with a reception time of the SSB; $T_{first\ TRS}$ is associated with a reception time of the reference signal; $\min(T_{first\ SSB}, T_{first\ RS})$ is determined by which of the reference signal or SSB is received first; $T_{proc}$ is associated with a processing time of the $T_{first\ SSB}$ or a processing time of the $T_{first\ RS}$, according to which of the reference signal or SSB is received first; and NR slot length is associated with a slot length.

Example 16 comprises the subject matter of example 15, further configured to, after decoding the activation command: perform reference signal receive power (RSRP) measurements associated with the target TCI state; and receive the TCI resource after decoding the activation command and according to the RSRP measurements.

Example 17 comprises the subject matter of example 16, further configured to receive a physical downlink control channel (PDCCH) message according to the target TCI state after: a slot $n+(T_{RRC\_PROCESSING}$/NR slot length$)+T_{L1-RSRP}+TO_k*(\min(T_{first\ SSB}, T_{first\ RS})+T_{proc})$/NR slot length wherein $T_{L1-RSRP}$ is associated with a time to perform the RSRP measurements.

Example 18 comprises the subject matter of example 16, further configured to receive a physical downlink control channel (PDCCH) message according to the target TCI state after: a slot $n+(T_{RRC\_PROCESSING}$/NR slot length$)+\min(T_{L1-RSRP\ AP\ RS}, T_{L1-RSRP\ SSB})+TO_k*(\min(T_{first\ SSB}, T_{first\ RS})+T_{proc})$/NR slot length wherein $T_{L1-RSRP\ AP\ RS}$ is associated with a time to complete RSRP measurements according to an aperiodic resource signal (AP RS); and $T_{L1-RSRP\ SSB}$ is associated with a time to complete RSRP measurements according to an SSB.

Example 19 is a base station (BS), comprising: A memory interface; and processing circuitry communicatively coupled to the memory interface and configured to: transmit a physical downlink shared channel (PDSCH) message that includes an activation command indicating a target transmission configuration indicator (TCI) state; transmit a TCI resource wherein the TCI resource is a reference signal after generating the activation command, wherein the TCI resource is for a User Equipment (UE) in performing time and frequency tracking associated with the target TCI state; and determine a time at which the UE can receive a PDCCH using the target TCI state based on the TCI resource.

Example 20 comprises the subject matter of example 19, wherein the reference signal is not a synchronization signal block (SSB).

Example 21 comprises the subject matter of example 19, wherein the activation command is a medium access control control element (MAC CE) activation command.

Example 22 comprises the subject matter of example 19, wherein the activation command is a radio resource control (RRC) activation command.

Example 23 comprises the subject matter of example 19, wherein the TCI resource is transmitted during a decoding period for the UE associated with the activation command, and the TCI resource is the reference signal or a synchronization signal block (SSB).

Example 24 comprises the subject matter of example 19, wherein the TCI resource is transmitted according to a reference signal periodicity.

Example 25 comprises the subject matter of any of examples 19-24, further configured to transmit a plurality of TCI resources according to a plurality of component carriers (CCs) wherein the plurality of CCs are of a same band or of a common beam management (CBM).

Example 26 comprises the subject matter of any of examples 19-24, wherein the reference signal is a tracking reference signal (TRS) or aperiodic reference signal (AP RS).

Example 27 is a user equipment (UE), comprising: a memory interface; and processing circuitry communicatively coupled to the memory interface and configured to: receive a transmission configuration indicator (TCI) state switch command to switch to a target TCI state; receive a reference signal associated with the target TCI state; receive an activation command associated with the reference signal; perform time and frequency tracking on the reference signal; and switch to the target TCI state after performing the time and frequency tracking.

Example 28 comprises the subject matter of example 27, wherein the TCI state switch command is received in a radio resource control (RRC) message.

Example 29 comprises the subject matter of example 28, wherein the reference signal is received in the RRC message.

Example 30 comprises the subject matter of example 27, wherein the reference signal is received in a layer 1 (L1) downlink control indicator (DCI).

Example 31 comprises the subject matter of example 27, wherein the activation command is a medium access control control element (MAC CE) activation command or a radio resource control (RRC) activation command.

Example 32 is a Base Station (BS), comprising: a memory interface; and processing circuitry communicatively coupled to the memory interface and configured to: transmit a transmission configuration indicator (TCI) state switch command for a target TCI state; transmit a reference signal associated with the target TCI state; transmit an activation command associated with the reference signal; and transmit a physical downlink control channel (PDCCH) message according to the target TCI state.

Example 33 comprises the subject matter of example 32, wherein the TCI state switch command is transmitted in a radio resource control (RRC) message.

Example 34 comprises the subject matter of example 33, wherein the reference signal is transmitted in the RRC message.

Example 35 comprises the subject matter of example 32, wherein the reference signal is transmitted in a layer 1 (L1) downlink control indicator (DCI).

Example 36 comprises the subject matter of example 32, wherein the activation command is a medium access control control element (MAC CE) activation command or a radio resource control (RRC) activation command.

A non-volatile or non-transitory computer-readable medium that stores instructions that, when executed, cause the performance of any action or combination of actions as substantially described herein, comprised in examples 1-36, and in the Detailed Description.

A method as substantially described herein with reference to each or any combination substantially described herein, comprised in examples 1-36, and in the Detailed Description.

A wireless device configured to perform any action or combination of actions as substantially described herein, comprised in examples 1-36, and in the Detailed Description.

An integrated circuit configured to perform any action or combination of actions as substantially described herein, comprised in examples 1-36, and in the Detailed Description.

An apparatus configured to perform any action or combination of actions as substantially described herein, comprised in examples 1-36, and in the Detailed Description.

A baseband processor configured to perform any action or combination of actions as substantially described herein, comprised in examples 1-36, and in the Detailed Description.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communication media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal or apparatus.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

The present disclosure is described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

What is claimed is:

1. A user equipment (UE), comprising:
a memory interface; and
processing circuitry communicatively coupled to the memory interface and configured to:
receive a physical downlink shared channel (PDSCH) message that includes an activation command indicating a target transmission configuration indicator (TCI) state;
decode the activation command within a decoding period, wherein the decoding period is a time period allocated for the UE to decode the activation command;
receive a reference signal and a synchronization signal block (SSB);
determine a TCI resource wherein the TCI resource is the reference signal or the SSB determined by which of the reference signal or SSB is received first;
perform time and frequency tracking associated with the target TCI state according to the TCI resource;
switch to the target TCI state after performing time and frequency tracking; and
receive a physical downlink control channel (PDCCH) message according to the target TCI state after a time defined by:
a slot $n+THARQ+3N_{slot}^{subframe,\mu}+TOk*(min(Tfirst\ SSB, Tfirst\ RS)+Tproc)/NR$ slot length
wherein THARQ corresponds to a timing between a downlink (DL) data transmission and an acknowledgement;
$3N_{slot}^{subframe,\mu}$ corresponds to the decoding period;
TOk is 1 when the target TCI state is in an active TCI state list for PDSCH and 0 otherwise;
Tfirst SSB is associated with a reception time of the SSB;
Tfirst RS is associated with a reception time of the reference signal;
min(Tfirst SSB, Tfirst RS) is determined by which of the reference signal or SSB is received first;
Tproc is associated with a processing time of the Tfirst SSB or a processing time of the Tfirst RS, according to which of the reference signal or SSB is received first; and
NR slot length is associated with a slot length.

2. The UE of claim 1, wherein the activation command is a medium access control control element (MAC CE) activation command or a radio resource control (RRC) activation command.

3. The UE of claim 1, wherein after decoding the activation command, the processing circuitry is further configured to:
perform reference signal receive power (RSRP) measurements associated with the target TCI state; and
receive the TCI resource after decoding the activation command and according to the RSRP measurements.

4. The UE of claim 3, further configured to determine a best receive (Rx) beam for use with the target TCI state based on the RSRP measurements.

5. The UE of claim 1, wherein the TCI resource is the synchronization signal block (SSB).

6. The UE of claim 5, further configured to receive a physical downlink control channel (PDCCH) message after decoding the SSB, wherein the PDCCH is received before decoding another TCI resource.

7. The UE of claim 1, wherein the TCI resource is a tracking reference signal (TRS).

8. The UE of claim 7, further configured to receive a physical downlink control channel (PDCCH) message after decoding the TRS, wherein the PDCCH is received before decoding another TCI resource.

9. A base station (BS), comprising:
a memory interface; and
processing circuitry communicatively coupled to the memory interface and configured to:
transmit, by a radio frequency (RF) circuitry, a physical downlink shared channel (PDSCH) message that includes an activation command indicating a target transmission configuration indicator (TCI) state;
transmit, by the RF circuitry, a plurality of TCI resources that include a reference signal and a synchronization signal block (SSB) after generating the activation command, wherein the plurality of TCI resources are for a User Equipment (UE) in performing time and frequency tracking associated with the target TCI state, wherein the UE receives one of the plurality of TCI resources after the UE decodes the activation command and before expiration of a decoding period allocated for the UE to decode the activation command; and
transmit a physical downlink control channel (PDCCH) message according to the target TCI state, wherein the PDCCH message is received by the UE after a time defined by:
a slot $n+THARQ+3N_{slot}^{subframe,\mu}+TOk^*(min(Tfirst\ SSB, Tfirst\ RS)+Tproc)/NR$ slot length
wherein THARQ corresponds to a timing between a downlink (DL) data transmission and an acknowledgement;
$3N_{slot}^{subframe,\mu}$ corresponds to the decoding period;
TOk is 1 when the target TCI state is in an active TCI state list for PDSCH and 0 otherwise;
Tfirst SSB is associated with a reception time of the SSB;
Tfirst TRS is associated with a reception time of the reference signal;
min(Tfirst SSB, Tfirst RS) is determined by which of the reference signal or SSB is received first;
Tproc is associated with a processing time of the Tfirst SSB or a processing time of the Tfirst RS, according to which of the reference signal or SSB is received first; and
NR slot length is associated with a slot length.

10. The BS of claim 9, wherein the plurality of TCI resources are transmitted according to a reference signal periodicity.

11. The BS of claim 9, wherein the activation command is a medium access control control element (MAC CE) activation command.

12. The BS of claim 9, wherein the activation command is a radio resource control (RRC) activation command.

13. The BS of claim 9, wherein one of the plurality of TCI resources is the SSB.

14. A baseband processor of a user equipment (UE), configured to:
receive a physical downlink shared channel (PDSCH) message that includes an activation command indicating a target transmission configuration indicator (TCI) state;
decode the activation command within a decoding period, wherein the decoding period is a time period allocated for the UE to decode the activation command;
receive a reference signal and a synchronization signal block (SSB);
determine a TCI resource wherein the TCI resource is the reference signal or the SSB determined by which of the reference signal or SSB is received first;
perform time and frequency tracking associated with the target TCI state according to the TCI resource;
switch to the target TCI state after performing time and frequency tracking; and
receive a physical downlink control channel (PDCCH) message according to the target TCI state after a time defined by:
a slot $n+T_{HARQ}+3+TO_k^*(min(T_{first\ SSB}, T_{first\ RS})+T_{proc})/NR$ slot length
wherein $T_{HARQ}$ corresponds to a timing between a downlink (DL) data transmission and an acknowledgement;
3 corresponds to the decoding period;
$TO_k$ is 1 when the target TCI state is in an active TCI state list for PDSCH and 0 otherwise;
$T_{first\ SSB}$ is associated with a reception time of the SSB;
$T_{first\ TRS}$ is associated with a reception time of the reference signal;
$min(T_{first\ SSB}, T_{first\ RS})$ is determined by which of the reference signal or SSB is received first;
$T_{proc}$ is associated with a processing time of the $T_{first\ SSB}$ or a processing time of the $T_{first\ RS}$, according to which of the reference signal or SSB is received first; and
NR slot length is associated with a slot length.

15. The baseband processor of claim 14, further configured to, after decoding the activation command:
perform reference signal receive power (RSRP) measurements associated with the target TCI state; and
receive the TCI resource after decoding the activation command and according to the RSRP measurements.

16. The baseband processor of claim 15, further configured to receive a physical downlink control channel (PDCCH) message according to the target TCI state after:
a slot $n+T_{HARQ}+3+T_{L1-RSRP}+TO_k^*(min(T_{first\ SSB}, T_{first\ RS})+T_{proc})/NR$ slot length
wherein $T_{L1-RSRP}$ is associated with a time to perform the RSRP measurements.

17. The baseband processor of claim 15, further configured to receive a physical downlink control channel (PDCCH) message according to the target TCI state after:
a slot $n+T_{HARQ}+3+min(T_{L1-RSRP\ AP\ RS}, T_{L1-RSRP\ SSB})+TO_k^*(min(T_{first\ SSB}, T_{first\ RS})+T_{proc})/NR$ slot length
wherein $T_{L1-RSRP\ AP\ RS}$ is associated with a time to complete RSRP measurements according to an aperiodic resource signal (AP RS); and
$T_{L1-RSRP\ SSB}$ is associated with a time to complete RSRP measurements according to an SSB.

18. The baseband processor of claim 14, further configured to receive a plurality of TCI resources according to a plurality of component carriers (CCs) wherein the plurality of CCs are of a same band or of a common beam management (CBM); and
the TCI resource is determined to be one of the plurality of TCI resources that was received first amongst the plurality of CCs.

19. The baseband processor of claim 14, wherein the activation command is a medium access control control element (MAC CE) activation command or a radio resource control (RRC) activation command.

20. The baseband processor of claim 14, wherein the TCI resource is the synchronization signal block (SSB).

* * * * *